United States Patent
Kotab

(10) Patent No.: US 11,231,289 B2
(45) Date of Patent: Jan. 25, 2022

(54) SYSTEMS, METHODS AND COMPUTER PROGRAM PRODUCTS FOR SHARING GEOGRAPHICAL DATA

(71) Applicant: Dominic M. Kotab, San Jose, CA (US)

(72) Inventor: Dominic M. Kotab, San Jose, CA (US)

(*) Notice: Subject to any disclaimer, the term of this patent is extended or adjusted under 35 U.S.C. 154(b) by 405 days.

(21) Appl. No.: 15/409,444

(22) Filed: Jan. 18, 2017

(65) Prior Publication Data
US 2017/0123069 A1    May 4, 2017

Related U.S. Application Data

(63) Continuation of application No. 12/562,062, filed on Sep. 17, 2009, now abandoned, which is a
(Continued)

(51) Int. Cl.
*G01C 21/34*    (2006.01)
*H04W 4/02*    (2018.01)
(Continued)

(52) U.S. Cl.
CPC ..... *G01C 21/3461* (2013.01); *G01C 21/3492* (2013.01); *H04W 4/029* (2018.02); *H04W 4/14* (2013.01); *G01S 5/0072* (2013.01)

(58) Field of Classification Search
CPC ....... H04W 4/02; H04W 64/00; H04W 4/023; H04W 4/04; H04W 4/008; H04W 4/025;
(Continued)

(56) References Cited

U.S. PATENT DOCUMENTS

| 6,421,606 B1* | 7/2002 | Asai | G01C 21/3423 |
| | | | 701/410 |
| 6,574,553 B1* | 6/2003 | Beesley | G01C 21/30 |
| | | | 340/990 |

(Continued)

OTHER PUBLICATIONS

Final Office Action from U.S. Appl. No. 15/013,867, dated Sep. 22, 2017.
(Continued)

*Primary Examiner* — Magdi Elhag
(74) *Attorney, Agent, or Firm* — Zilka-Kotab, P.C.

(57) ABSTRACT

According to one embodiment, a system comprises a first mobile device comprising a processor; and a computer usable medium, where the computer usable medium has computer usable program code embodied therewith, which when executed by the processor causes the processor to send a request for a location of a closest person to the first mobile device, determine a first location of the first mobile device, receive, in response to the request, a plurality of potential matches, where each of the potential matches includes a name and location of a person, receive a selection of one of the plurality of potential matches, obtain location coordinates of the selected potential match, establish a link with a global positioning service (GPS) system, transmit geographical data to the GPS system, wherein the geographical data includes the location coordinates of the selected potential match, and output a geographic solution on the first mobile device, wherein the geographic solution includes: a calculated route between the first location of the first mobile device and the location coordinates of the selected potential match, and information associated with the calculated route, the information including one or more of an estimated travel time, an average travelling speed, and an elapsed travel time.

20 Claims, 13 Drawing Sheets

Related U.S. Application Data continuation-in-part of application No. 12/556,791, filed on Sep. 10, 2009, now Pat. No. 9,264,856.

(60) Provisional application No. 61/095,920, filed on Sep. 10, 2008, provisional application No. 61/109,456, filed on Oct. 29, 2008.

(51) Int. Cl.
- *H04W 4/14* (2009.01)
- *H04W 4/029* (2018.01)
- *G01S 5/00* (2006.01)

(58) Field of Classification Search
CPC ..... H04W 4/12; H04W 64/003; H04W 74/06; H04W 4/14; H04M 1/72572; H04M 3/42348; H04M 2242/30; H04M 2250/02; H04M 2250/10; G01C 21/3461; G01C 21/3492; G01S 5/0072
USPC .... 455/404.2, 456.1, 456.2, 456.3, 457, 459
See application file for complete search history.

(56) References Cited

U.S. PATENT DOCUMENTS

| | | | | |
|---|---|---|---|---|
| 6,810,323 B1* | 10/2004 | Bullock | ............... | G08G 1/0969 340/991 |
| 8,036,678 B2* | 10/2011 | Goldenberg | ........ | G06F 17/3087 345/165 |
| 8,121,780 B2* | 2/2012 | Gerdes | ............... | G01C 21/3423 340/439 |
| 8,229,458 B2* | 7/2012 | Busch | ..................... | H04L 67/22 455/456.1 |
| 8,532,678 B2* | 9/2013 | Geelen | ................. | G08G 1/0969 455/41.3 |
| 8,538,458 B2* | 9/2013 | Haney | ..................... | H04W 4/08 455/456.1 |
| 8,706,134 B2* | 4/2014 | Wasserman | ............ | G01C 21/20 340/988 |
| 9,251,521 B2* | 2/2016 | Frank | ..................... | H04L 67/18 |
| 10,237,701 B2 | 3/2019 | Kotab | | |
| 2002/0063472 A1* | 5/2002 | Irvin | .................. | B60R 25/2009 307/10.1 |
| 2004/0024522 A1* | 2/2004 | Walker | ............... | G01C 21/3492 701/414 |
| 2004/0039504 A1* | 2/2004 | Coffee | .................... | B28C 5/422 701/482 |
| 2005/0065715 A1* | 3/2005 | Watanabe | .............. | G01C 21/26 701/517 |
| 2005/0198084 A1* | 9/2005 | Kim | ..................... | H04L 12/6418 |
| 2005/0272473 A1* | 12/2005 | Sheena | ............... | H04M 3/4931 455/563 |
| 2006/0089160 A1* | 4/2006 | Othmer | ............. | H04M 1/72572 455/457 |
| 2007/0067088 A1* | 3/2007 | Baig | ....................... | B60R 11/02 701/96 |
| 2007/0150174 A1* | 6/2007 | Seymour | ........... | G01C 21/3617 701/532 |
| 2008/0027635 A1* | 1/2008 | Tengler | ................. | G01C 21/36 701/533 |
| 2008/0102858 A1* | 5/2008 | Giniger | ............... | G06F 17/3087 455/456.3 |
| 2008/0114541 A1* | 5/2008 | Shintani | ............... | G01C 21/362 701/420 |
| 2008/0167804 A1* | 7/2008 | Geelen | .............. | G01C 21/3655 701/408 |
| 2008/0188246 A1* | 8/2008 | Sheha | ..................... | G01C 21/26 455/457 |
| 2008/0268876 A1* | 10/2008 | Gelfand | ................. | G06Q 30/02 455/457 |
| 2009/0005968 A1* | 1/2009 | Vengroff | ............. | G06F 17/3087 701/425 |
| 2009/0105940 A1* | 4/2009 | Bitan | .................. | G01C 21/3415 701/533 |
| 2009/0138353 A1* | 5/2009 | Mendelson | .......... | G01C 21/206 705/14.39 |
| 2009/0157302 A1 | 6/2009 | Tashev et al. | | |
| 2009/0233629 A1* | 9/2009 | Jayanthi | ............... | H04L 12/5865 455/457 |
| 2010/0191456 A1* | 7/2010 | Nogawa | ................. | G01C 21/32 701/533 |

OTHER PUBLICATIONS

Non-Final Office Action from U.S. Appl. No. 15/013,867, dated Apr. 4, 2018.
Advisory Action from U.S. Appl. No. 15/013,867, dated Dec. 13, 2017.
Corrected Notice of Allowance from U.S. Appl. No. 15/013,867, dated Feb. 6, 2019.
Notice of Allowance from U.S. Appl. No. 15/013,867, dated Oct. 25, 2018.

* cited by examiner

SYSTEMS, METHODS AND COMPUTER PROGRAM PRODUCTS FOR SHARING GEOGRAPHICAL DATA

RELATED APPLICATIONS

This application is a continuation of U.S. patent application Ser. No. 12/562,062, filed Sep. 17, 2009, which claims priority to U.S. provisional patent application No. 61/109,456, filed Oct. 29, 2008, and is a continuation-in-part of U.S. patent application Ser. No. 12/556,791, filed Sep. 10, 2009, which claims priority to U.S. provisional patent application No. 61/095,920, filed Sep. 10, 2008, all of which are herein incorporated by reference.

FIELD OF THE INVENTION

The present invention relates to GPS systems, and more particularly to systems, methods and computer program products for sharing geographical data between devices.

SUMMARY

According to one embodiment, a system comprises a first mobile device comprising a processor; and a computer usable medium, where the computer usable medium has computer usable program code embodied therewith, which when executed by the processor causes the processor to send, from the first mobile device, a request including information associated with a mobile device of a friend of a user, determine a first location of the first mobile device; receive, in response to the request, a location of the mobile device of the friend of the user, establish a link with a global positioning service (GPS) system, transmit geographical data to the GPS system, wherein the geographical data includes the location of the mobile device of the friend of the user and the first location of the first mobile device, and output a geographic solution on the first mobile device, wherein the geographic solution includes: a calculated route between the first location of the first mobile device and the location of the mobile device of the friend of the user, and information associated with the calculated route, the information including one or more of an estimated travel time, an average travelling speed, and an elapsed travel time.

In another embodiment, a method comprises sending, from a first mobile device, a request including information associated with a mobile device of a friend of a user, determining a first location of the first mobile device, receiving, in response to the request, a location of the mobile device of the friend of the user, establishing a link with a global positioning service (GPS) system, transmitting geographical data to the GPS system, wherein the geographical data includes the location of the mobile device of the friend of the user and the first location of the first mobile device, and outputting a geographic solution on the first mobile device, wherein the geographic solution includes: a calculated route between the first location of the first mobile device and the location of the mobile device of the friend of the user, and information associated with the calculated route, the information including one or more of an estimated travel time, an average travelling speed, and an elapsed travel time.

In yet another embodiment, a method comprises sending a request from a first mobile device, including information associated with a mobile device of a friend of a user, determining a first location of the first mobile device, receiving, in response to the request, a location of the mobile device of the friend of the user, establishing a link with a global positioning service (GPS) system, transmitting geographical data to the GPS system, wherein the geographical data includes the location of the mobile device of the friend of the user and the first location of the first mobile device, and outputting a geographic solution on the first mobile device, wherein the geographic solution includes: a calculated route between the first location of the first mobile device and the location of the mobile device of the friend of the user and the first location of the first mobile device.

In another embodiment, a system comprises a server including a processor for receiving a request from a first mobile device including information associated with a mobile device of a friend of a user, determining a location of the mobile device of the friend of the user, sending to the first mobile device the location of the mobile device of the friend of the user, wherein the first mobile device establishes a link with a global positioning service (GPS) system, wherein the first mobile device transmits geographical data to the GPS system, wherein the geographical data includes the location of the mobile device of the friend of the user and the first location of the first mobile device, wherein the first mobile device outputs a geographic solution, wherein the geographic solution includes: a calculated route between a location of the first mobile device and the location of the mobile device of the friend of the user, and information associated with the calculated route, the information including one or more of an estimated travel time, an average travelling speed, and an elapsed travel time.

In another embodiment, a method comprises receiving at a server a request from a first mobile device including information associated with a mobile device of a friend of a user; determining at the server a location of the mobile device of the friend of the user, sending from the server to the first mobile device the location of the mobile device of the friend of the user, wherein the first mobile device establishes a link with a global positioning service (GPS) system, wherein the first mobile device transmits geographical data to the GPS system, wherein the geographical data includes the location of the mobile device of the friend of the user and the first location of the first mobile device, wherein the first mobile device outputs a geographic solution, wherein the geographic solution includes: a calculated route between a location of the first mobile device and the location of the mobile device of the friend of the user and the first location of the first mobile device, and information associated with the calculated route, the information including one or more of an estimated travel time, an average travelling speed, and an elapsed travel time.

In another embodiment, a method comprises receiving at a server a request from a first mobile device including information associated with a mobile device of a friend of a user, determining at the server a location of the mobile device of the friend of the user, and sending from the server to the first mobile device the location of the mobile device of the friend of the user, wherein the first mobile device establishes a link with a global positioning service (GPS) system, wherein the first mobile device transmits geographical data to the GPS system, wherein the geographical data includes the location of the mobile device of the friend of the user and the first location of the first mobile device, wherein the first mobile device outputs a geographic solution, wherein the geographic solution includes: a calculated route between a location of the first mobile device and the location of the mobile device of the friend of the user and the first location of the first mobile device.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Figure 1:
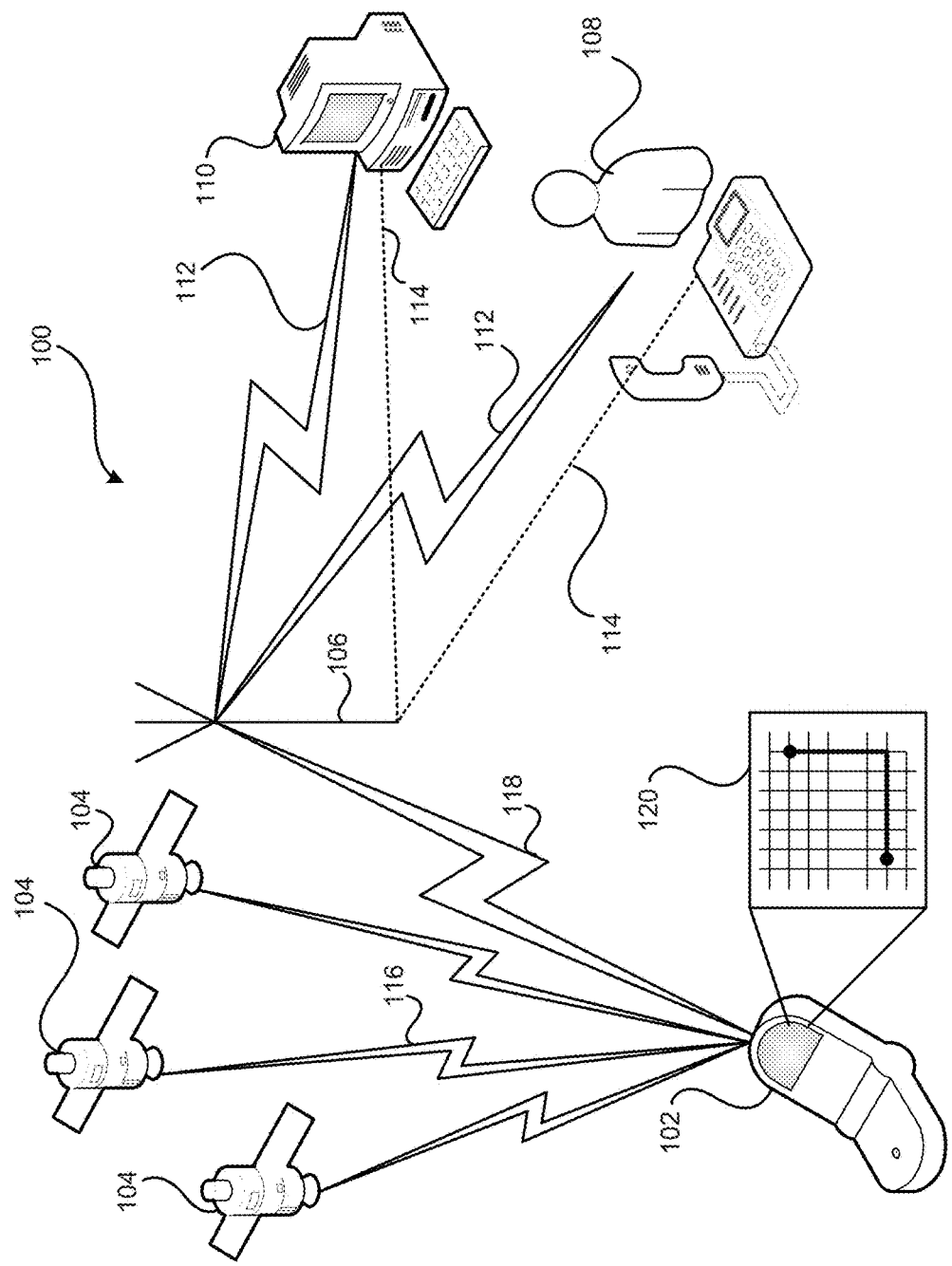
FIG. 1 is a simple schematic diagram of a system 100 for retrieving geographical directions according to one embodiment.

Various embodiments of the present invention are described in further detail below with reference to the figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," an and the include plural referents unless otherwise specified.

According to one general embodiment, a method comprises sending a request to a mobile device requesting that the mobile device transmit geographic data; receiving geographical data from the mobile device; integrating the received geographical data with previously stored or generated data; producing a geographic solution using the integrated data; and outputting a the geographic solution.

In another general embodiment, a method comprises receiving a request to synchronize data with a vehicle mounted global positioning service (GPS) system; and transmitting geographic data to the vehicle mounted GPS system.

In another general embodiment, a method comprises sending a request to synchronize geographic data with a vehicle mounted global positioning service (GPS) system; receiving a confirmation to synchronize geographic data from the vehicle mounted GPS system; and communicating geographic data between the vehicle mounted GPS system and a requesting device.

In another general embodiment, a method comprises receiving geographic data from a mobile global positioning service (GPS) unit; using the received geographic data to produce a geographic solution; and outputting the geographic solution.

In another general embodiment, a method comprises establishing a link between a mobile global positioning service (GPS) unit and a vehicle mounted GPS system; and transmitting geographic data from the mobile GPS unit to the vehicle mounted GPS system.

In another general embodiment, a method comprises sending a request to synchronize data with a vehicle mounted global positioning service (GPS) system; receiving a confirmation to synchronize geographic data from the vehicle mounted GPS system; and communicating geographic data between the vehicle mounted GPS system and a requesting device.

With reference to FIG. 1, a simple schematic diagram of a system 100 for retrieving geographical directions on a GPS-equipped mobile device is shown. FIG. 1 may be used to describe other methods of retrieving and sending directions and locations to and from GPS enabled mobile devices later in this application. A mobile device 102 may be any GPS-equipped device capable of sending and receiving GPS information such as a mobile telephone, personal digital assistant (PDA), personal GPS device, automobile mounted GPS device, BLACKBERRY® device, APPLE iPHONE®, mobile phone running ANDROID®, etc. The mobile device 102 may send and receive signals 116 from one or multiple GPS satellites 104, resulting in the satellites 104 being able to triangulate, pinpoint, approximate, or interpolate the location or approximate location of the mobile device 102. The mobile device 102 may also be capable of transmitting and receiving a standard mobile telephone signal 118, or short service message (SMS) or other text carrying signal which can then be sent from an antenna 106 or a satellite to an operator 108 or computer controlled automatic operator 110 via landline 114 or other communication technique 112. Other communication techniques include electronic communications across broadband devices, mobile telephone communications, satellite communications, etc. A landline indicates a terrestrial telephone network, which can be analog or preferably digital.

These channels of communication allow a user of the mobile device 102 to request directions to a location, which the operator 108 or computer controlled automatic operator 110 can decipher, e.g., via voice recognition, touch pad tone recognition, text recognition, etc., and return coordinates for the location to the mobile device 102, for purposes of the mobile device 102 displaying a present location of the mobile device 102 and/or a location of the desired destination and/or directions to proceed to the destination, possibly in the form of a map 120, text message, graphical layout, etc.

The user of the mobile device 102 may request directions via any available communications channel, such as via a telephone call to an operator 108 or computer controlled automatic operator 110, a text message to an operator 108 or computer controlled automatic operator 110, a telephone call into an automated response system (e.g., such that the user can enter keystrokes that signal desired responses to the automated response system), etc.

FIGS. 2-6 show various methods according to multiple embodiments. Each method may be carried out in the context of functionality of FIG. 1, or in any other environment as desired.

Figure 2:
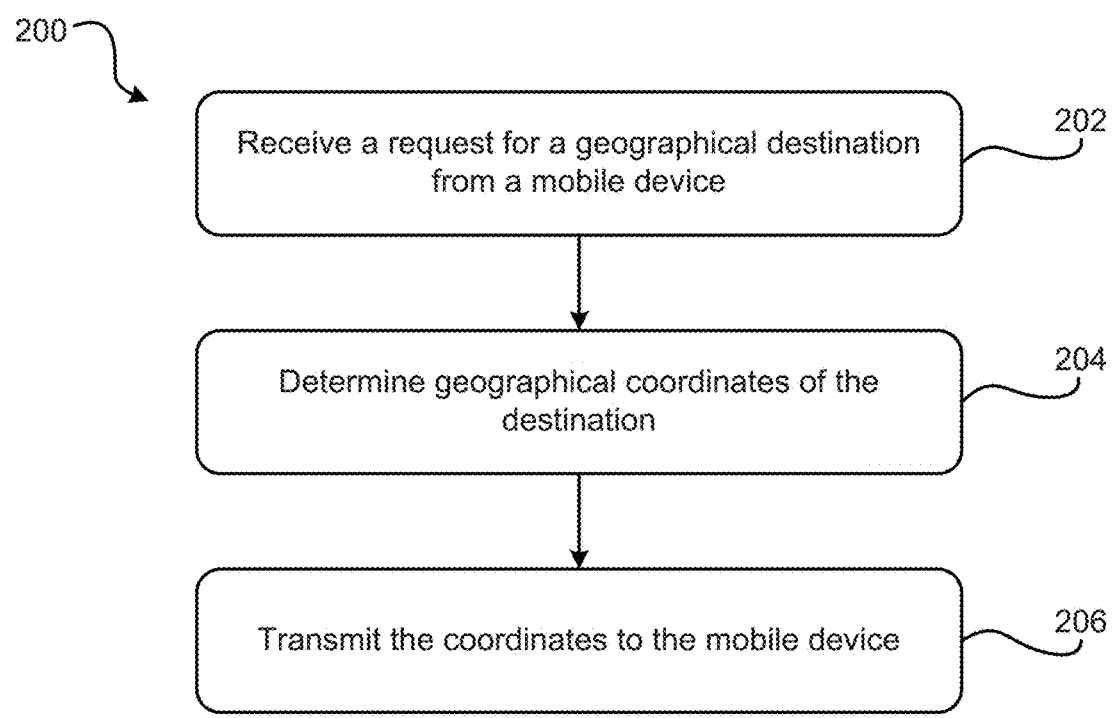
FIG. 2 shows a method according to one embodiment.

Referring to FIG. 2, in operation 202, a request for a geographical destination is received from a mobile device. In operation 204, geographical coordinates of the destination are determined. In operation 206, the coordinates are transmitted to the mobile device.

Figure 3:
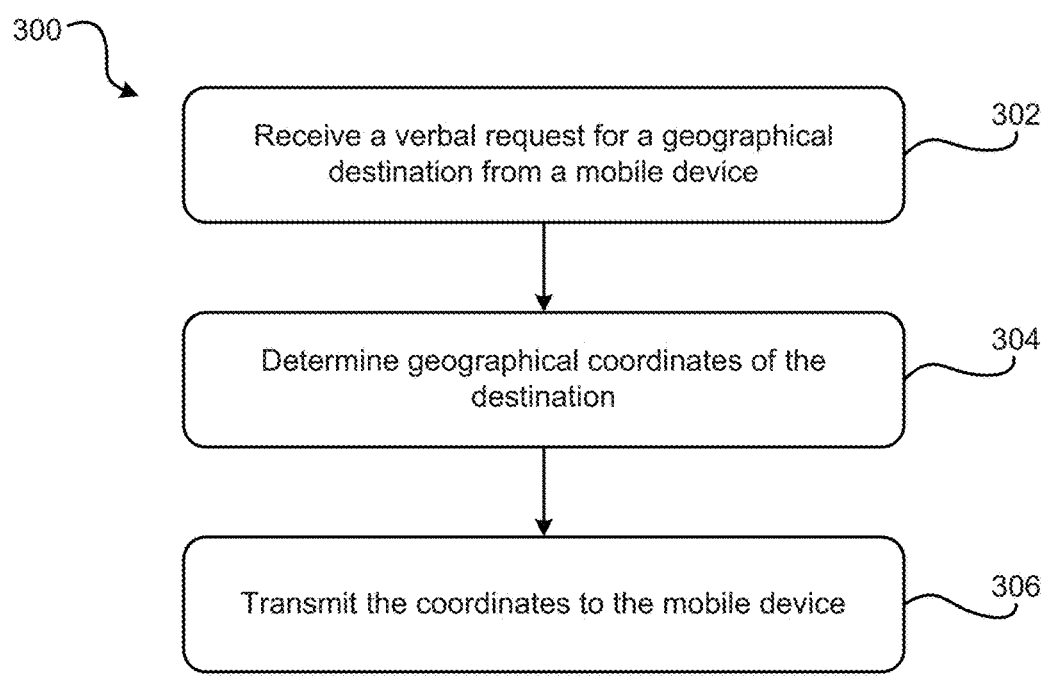
FIG. 3 shows a method according to one embodiment.

Referring to FIG. 3, in operation 302, a verbal request for a geographical destination is received from a mobile device. In operation 304, geographical coordinates of the destination are determined. In operation 306, the coordinates are transmitted to the mobile device.

Figure 4:
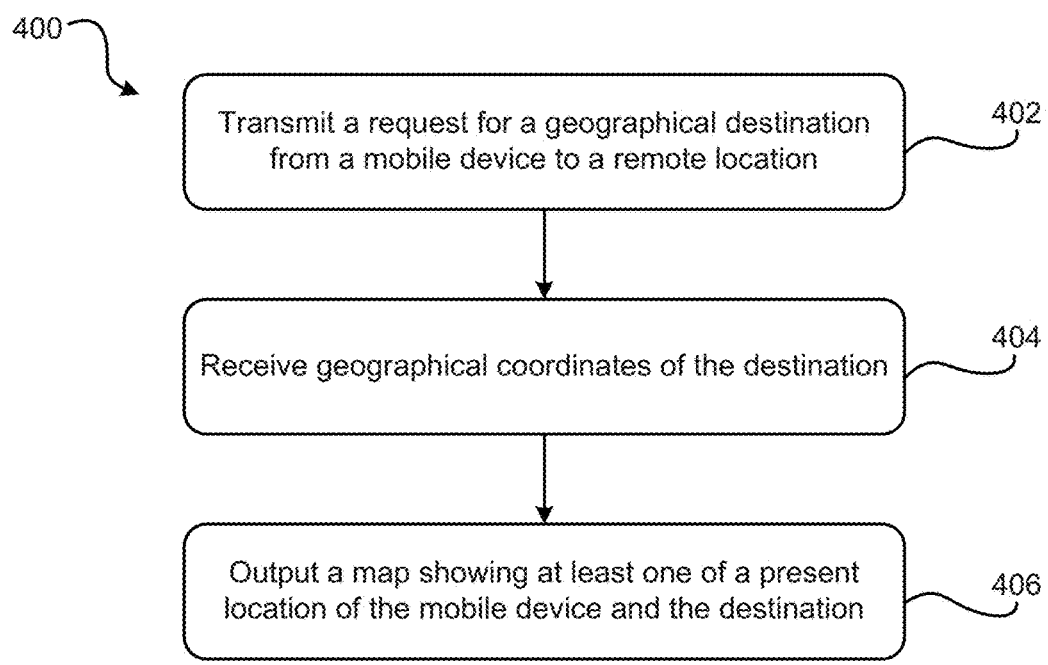
FIG. 4 shows a method according to one embodiment.

Referring to FIG. 4, in operation 402, a request for a geographical destination is transmitted from a mobile device to a remote location. In operation 404, geographical coordinates of the destination are received. In operation 406, a map showing at least one of a present location of the mobile device and the destination is output.

Figure 5:
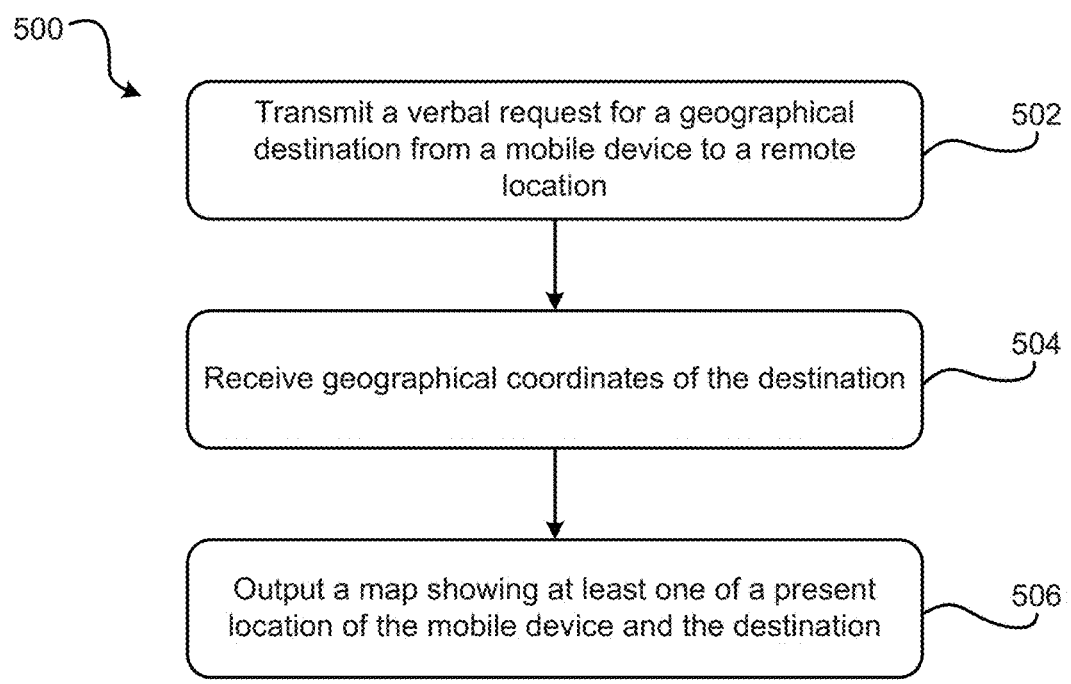
FIG. 5 shows a method according to one embodiment.

Referring to FIG. 5, in operation 502, a verbal request for a geographical destination from a mobile device is transmitted to a remote location. In operation 504, geographical coordinates of the destination are received. In operation 506, a map showing at least one of a present location of the mobile device and the destination is output.

Figure 6:
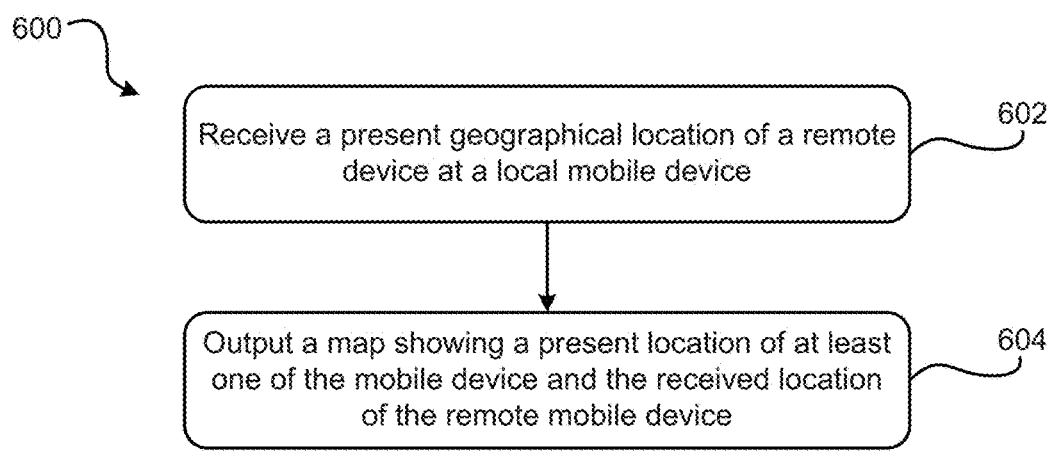
FIG. 6 shows a method according to one embodiment.

Referring to FIG. 6, in operation 602, a present geographical location of a remote mobile device is received at a local mobile device. In operation 604, a map showing a present location of at least one of the local mobile device and the received location of the remote mobile device is output.

In each embodiment, variations are possible at each step. For instance, the request for a geographical location may be initiated by the user of the mobile device, or may be automatically transmitted when certain predefined criteria are met. Furthermore, the request may be a verbal request. The request may be received by a live person or by an automatic device capable of responding to the request with the geographical location desired. The person receiving the request may be at a call center designed to handle such requests, or any other location.

In other embodiments, the geographical coordinates of several potential destinations may be determined and sent to the mobile device. The type of geographical coordinates is not critical. For example, illustrative types of geographical coordinates includes Cartesian coordinates, coordinates used by a mapping system or software, an address, coordinates commonly used in present GPS systems, etc. The file format of the geographical coordinates of several potential destinations that is sent to the mobile device may be any file type that can be recognized by the mobile device as would be known to one of reasonable skill in the relevant art, such as short message service (SMS), hyper test markup language (HTML), plain text, rich text, etc. The user can then select which destination to display on the mobile device and/or receive directions to. Further, one of the locations sent to or by the mobile device may be the present location of the mobile device, which can then be displayed on the mobile device as a point on a map, and/or can be used to generate directions from the present location to a desired location. The present location of the mobile device may be determined through GPS, triangulation of the mobile device, proximity to the closest mobile telephone tower, etc.

The file or transmission format or medium of the geographical coordinates, location, etc. may be transmitted to a mobile device using any known method. For example, the coordinates may be send in any format or messaging type that can be recognized by the mobile device as would be known to one of reasonable skill in the relevant art, such as SMS, a markup language such as hyper text markup language (HTML), plain text, rich text, email message, etc. Moreover, where a first mobile device sends its present geographical location information to a remote mobile device, the first mobile device may send the geographical location in the form of an email, a text message, SMS, message, a map with a marker showing the present geographical location generated at the sending device, etc. The receiving mobile device may then output an indication of received geographical location information, the map or a map generated based on the information, etc. Note that the receiving device may download map data and/or other data from a remote server as part of the outputting process. Moreover, any of the foregoing can be used to transmit location information to a receiving device or system, or to transmit location information from a sending device or system.

In another embodiment, the map that may be displayed on the mobile device may have a geographical representation highlighting at least part of a route between the present location and the destination. The map and/or route can include, among other things, roadway names, place names, points of interest, arrows, instructions to turn left or right, distances, etc. Moreover, the output can be updated from time to time based on an updated present location of the mobile device. In addition, text may accompany the map or may be provided alone which describes the present location of the mobile device and/or directions to reach the destination.

In a further embodiment, the mobile device may output verbal commands that contain at least a portion of the directions determined between the present location and the desired destination. This can include, among other things, roadway names, instructions to turn left or right, distances, etc. In addition, the verbal commands may include turn-by-turn directions, which aid a traveler in arriving at a destination or waypoint. Also, the associated visual commands may correspond to the verbal commands, and the visual display, such as a map, may update based on the progress and position of the mobile device. The mobile device may also output at least a portion of the directions in text format.

In still other embodiments, the method may be performed by another mobile device, thus allowing one user's device to send its location back to the requesting device. The user's device may receive the request, and may output the request to the user, e.g., as audible signals.

In some embodiments, the geographical coordinates of one or more potential destinations may be sent to the mobile device from the potential destination. For example, a restaurant may send the coordinates of the restaurant to a mobile phone in response to being called from the phone and asked directions to arrive at the restaurant. In this example, the restaurant may send the coordinates of the restaurant, and the mobile phone may use these coordinates along with a present location of the mobile device as determined through GPS or some other technique, to determine a route between the present location and the restaurant. Coordinates may be longitude and latitude, a street address, or some other code which can be understood by the mobile device such that the location of the restaurant can be pinpointed by the mobile device in proximity to the present location (such as 5 miles north, 3 miles east, two blocks south, etc.).

In more embodiments, the geographical coordinates of one or more potential destinations may be sent to the mobile device from a webpage, website, Internet server, etc. For example, the location of a potential destination may be requested by the mobile device and the website may respond by sending the coordinates of the potential destination. The mobile device may use these coordinates along with a present location of the mobile device as determined through GPS or some other technique, to determine a route between the present location and the potential destination. For example, a user may request the location of the closest pizza restaurants (or any other type of business, residence, person, government agency (such as police station, fire department, etc.), point of interest park, stadium, etc.), etc. on a webpage which can then display a list of potential matches. The user may then select one or more of the returned matches, and the webpage may send the coordinates of one or more of the selected matches to a mobile device where the user may access the locations.

In further approaches, the route calculated can be based on or include some criteria, such as a fastest route, shortest distance, shortest time, whether traveling by automobile or foot, modes of transit such as mass transit including transit stops, fees associated with chosen routes, traffic conditions on chosen routes, restrictions on chosen routes (such as weight limitations, height limitations, walking path availability, time restrictions, etc.), etc.

In one example of use, a user dials 411 from his or her mobile telephone, upon which the mobile telephone transmits the tones, pulses, bits, etc., associated with dialing 411. A connection is made between the telephone and an automated system and/or a call center. The automated system and/or a person at the call center may ask for the query, which is transmitted to the user's telephone. In response, the telephone transmits the user's request for a location of a pizza restaurant near the user's location and/or some other location. In the former case, a location of the mobile telephone may be transmitted from the mobile telephone itself, estimated based on which tower the telephone is communicating through, etc. In the latter case, the user may state a location such as a city, relative to some street address or cross street, etc.

If the name of the pizza restaurant is given, the location of that particular restaurant can be returned. If there are several branches of the restaurant in the vicinity of the mobile telephone, then the locations of the branches can be transmitted to the mobile telephone for output to the user. The user selection can be received and a route to the selected branch can be output. The route may be output as a map, a list of directions, a single direction which after being executed results in the next direction being displayed, a combination of any of the former, etc.

Similarly, if the request is simply for a pizza restaurant (or any other type or class of business, a person or persons, etc.), then the names and/or locations of several pizza restaurants can be sent to the mobile telephone for output to the user for selection of one or more thereof. These names and/or locations may be sent to the mobile telephone by the pizza restaurant (or any other type or class of business, a person or persons, etc.), using a telephone, computer, etc., that is capable of sending the coordinates such that the coordinates can be recognized by the mobile telephone.

A request for a location of a person's home (or business, or present location) can also be made. For instance, assume the user requests directions to Dominic Kotab's home. Coordinates (e.g., a street address, longitude and latitude, etc.) of Dominic Kotab's home may be obtained or derived from a database or other data source, e.g., white pages. The mobile device may be able to generate a route to the received street address based on data stored on the device, or it may retrieve any additional data it may need to calculate the route. Of course, any information that is stored on the mobile device may be used in any of the embodiments in order to expedite the process, or to save on charges that may be incurred for data transmission, time on telephone, etc.

In another approach, a request may include a telephone number, which may be used to determine a location associated with the telephone number. The resultant location can be handled as described herein. For example, a telephone number for a friend's mobile telephone may result in the location of the friend's mobile telephone being returned to the mobile device, and a route between the present location of the mobile device and the friend's mobile telephone can be determined.

Filters can also be applied. For example, the user may indicate a preferred distance of the destination from his or her location and/or some other location, e.g., in a city, relative to some street address or cross street, etc. According to one example, if a user is driving from point A to point B, and desires to stop at a CHEVRON gas station along the way (possibly because the user prefers gasoline with the TECHRON additive), the filter may remove CHEVRON gas stations from the returned locations that do not fall within a predetermined proximity to the path of travel between point A and point B. In another approach, restaurants within some predefined radius of the mobile device, or of some other location, can be output.

Methods for determining a present location of a mobile device may include, but are not limited to, GPS (preferably built into the device), other types of satellite positioning, estimation based on ground communications (e.g., triangulation to towers, signal strength proximity, etc.), etc. Moreover, combinations of any methods disclosed herein may be used.

Data for the maps output by the mobile device may be stored locally, downloaded in portions or as a whole as needed, a combination of these, etc. Moreover, the map may be rendered either via the mobile device or may be generated remotely and sent to the mobile device for output. In addition, the map may be rendered as lines and blocks, as satellite imagery, as a combination of shapes, symbols, and satellite imagery, etc.

To conserve power, the mobile device may selectively (e.g., automatically, under control of a user, etc.) suspend and initiate determination of its present location. For instance, GPS (or other) navigation of a mobile device may be disabled until the destination information is received, upon which it is initiated at least long enough to discern the present location. The GPS navigation may remain on until the destination is reached, or it may periodically request a position until the destination is reached, possibly determining the rate at which to periodically determine the position based in part on the rate of travel.

Integration with Additional GPS Devices

The foregoing systems and methodology may be integrated with systems and methodology for transferring data from a mobile device (used interchangeably with a mobile unit, mobile GPS unit, mobile GPS device, etc.) to another GPS device. For example, the information received by a mobile (or other) device from the remote source may be transferred to another device.

The following description illustrates how information may be transferred between devices. Again, the components and/or operations of the various embodiments may be combined in any manner in the various permutations of embodiments of the present invention.

According to one general embodiment, a method for synchronizing or transferring geographic data includes sending a request to a mobile GPS unit to transmit geographic data. In addition, the method includes receiving geographic data from the mobile GPS unit. Further, the method includes integrating the received geographic data with previously stored or generated data. Also, the method includes using the integrated geographic data to produce a geographic solution. Additionally, the method includes outputting the geographic solution.

In another general embodiment, a method includes receiving a request to synchronize data with a vehicle mounted GPS system; transmitting geographic data to the vehicle mounted GPS system; and waiting to receive a confirmation indicating that the transmission was successful, whereas if the confirmation is not received before a predetermined time period passes, retransmitting the geographic data to the vehicle mounted GPS system.

In another general embodiment, a system comprises a processor; a computer usable medium (used interchangeably herein with "computer readable medium"), the computer usable medium having computer usable program code embodied therewith, which when executed by the processor causes the processor to: send a request to transmit geographic data from a mobile GPS unit; receive the geographic data from a mobile GPS unit; integrate the received geographic data with previously stored data; use the integrated geographic data to produce a geographic solution; and output a geographic solution.

In another general embodiment, a computer program product for manipulating geographic data comprises a computer usable medium having computer usable program code embodied therewith, the computer usable program code comprising: computer usable program code configured to send a request to transmit geographic data from a mobile GPS unit; computer usable program code configured to receive the geographic data from a mobile GPS unit; computer usable program code configured to integrate the received geographic data with previously stored data; computer usable program code configured to use the integrated geographic data to produce a geographic solution; and computer usable program code configured to output the geographic solution.

In another general embodiment, a method comprises sending a request to synchronize geographic data with a vehicle mounted GPS system; receiving a confirmation to synchronize geographic data from the vehicle mounted GPS system; receiving geographic data from the vehicle mounted GPS system; transmitting geographic data to the vehicle mounted GPS system; and waiting to receive a confirmation indicating that the synchronization was successful, whereas if the confirmation is not received before a predetermined time period passes, resending the request to synchronize data with the vehicle mounted GPS system.

In another general embodiment, a method comprises receiving geographic data from a mobile GPS unit; using the received geographic data to produce a geographic solution; and outputting the geographic solution.

In yet another general embodiment, a method comprises establishing a link between a mobile GPS unit and a vehicle mounted GPS system; and transmitting geographic data from the mobile GPS unit to the vehicle mounted GPS system.

In another general embodiment, a system comprises a processor; a computer usable medium, the computer usable medium having computer usable program code embodied therewith, which when executed by the processor causes the processor to: receive geographic data from a mobile GPS unit; use the received geographic data to produce a geographic solution; and output a geographic solution.

In yet another general embodiment, a computer program product for manipulating geographic data comprises a computer usable medium having computer usable program code embodied therewith, the computer usable program code comprising: computer usable program code configured to receive geographic data from a mobile GPS unit; computer usable program code configured to use the received geographic data to produce a geographic solution; and computer usable program code configured to output the geographic solution.

In another general embodiment, a method includes sending a request to synchronize geographic data with a vehicle mounted GPS system; receiving a confirmation to synchronize geographic data from the vehicle mounted GPS system; receiving geographic data from the vehicle mounted GPS system; and transmitting geographic data to the vehicle mounted GPS system.

Figure 7:
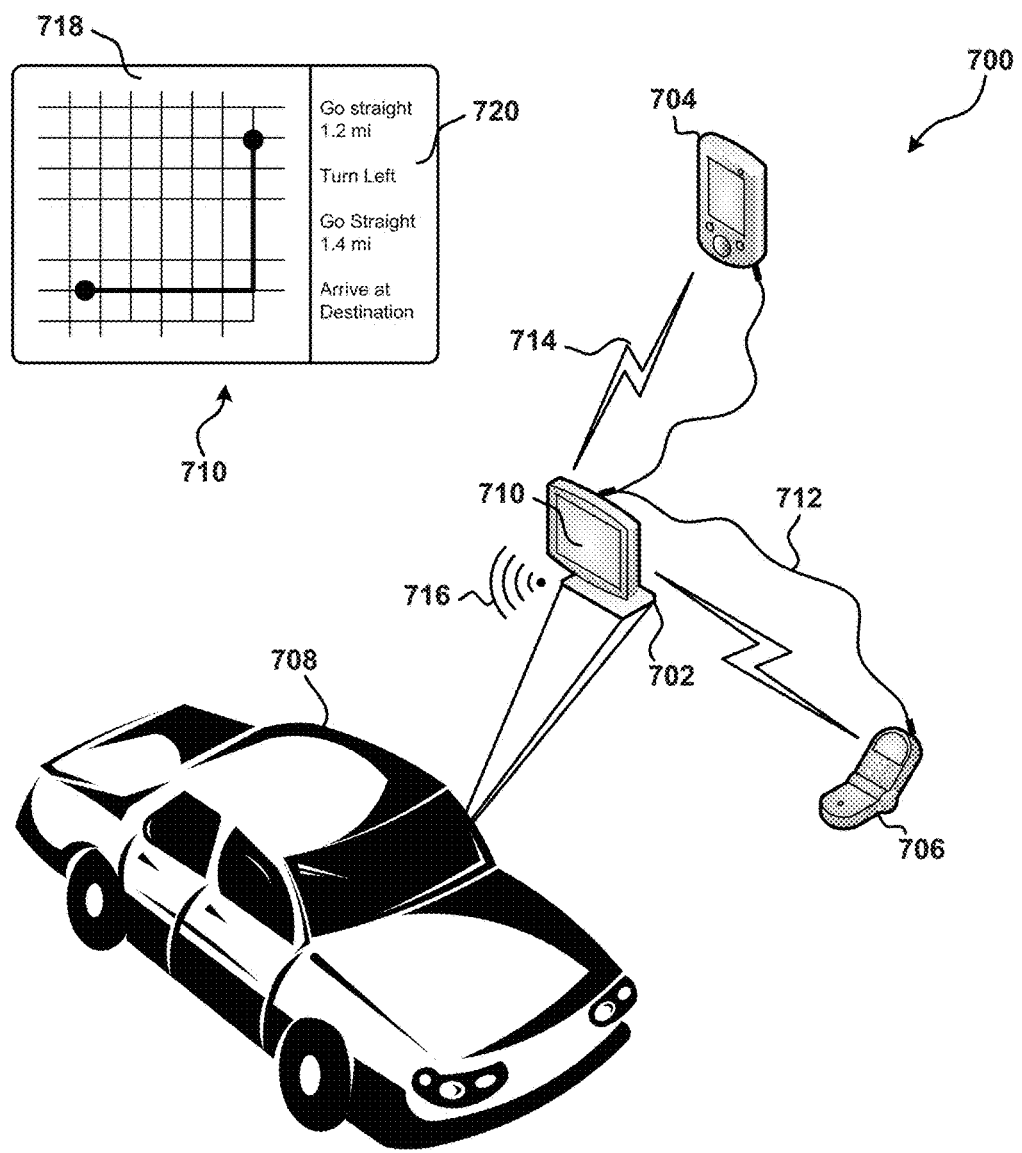
FIG. 7 is a schematic diagram of a system for synchronizing or transferring geographic data according to one embodiment.

FIG. 7 is a schematic diagram of a system 700 according to one embodiment. In FIG. 7, a system may include a vehicle mounted GPS system 702, which may include a display 710 which is capable of visually outputting geographic information. The vehicle 708 in which the GPS system 702 may be mounted might be a car, bus, truck, tractor-trailer, sailing vessel, motorboat, tugboat, freighter, aircraft, helicopter, bicycle, etc. In FIG. 7, the vehicle is depicted as a car, but this in no way limits the scope of the invention or type of vehicle in which the GPS system 702 may be mounted.

The GPS system 702 may be nonremovably coupled to the vehicle. By "nonremovably coupled" what is meant is that the GPS system is somehow integrated with or at least semi-permanently mounted in the structure of the vehicle (e.g., not readily detachable from the vehicle by a typical driver for exiting the vehicle therewith). For example, the GPS system may be integrated with an information system such as the BMW IDRIVE system. In another embodiment, the GPS system may output maps, directions, etc. via a display inset in the vehicle's dash and/or integrated audio system of the vehicle.

In another approach, the GPS system 702 may include a GPS navigational device adapted for removable mounting on a vehicle. For example, the device may include one or more suction cups for removably attaching the device to a glass or other smooth surface. In another example, the device may include a nonremovably (or non-reattachable) cradle which can be permanently coupled to the vehicle, with an interface with the device which allows for easy attaching and detaching with the cradle. Other types of mounting options may be used as we including hooks and loops fasteners, snaps, detachable cradles or mounts, visor clips, etc.

The GPS system 702 may generally include a processor for resolving inputs and/or outputs, computations, and/or various functions normally associated with a processor (e.g., microprocessor, application specific integrated circuit (ASIC), field programmable gate array (FPGA), etc.) in a GPS equipped device. Also, the GPS system 702 may include computer usable medium having computer usable program code embodied therewith. The computer usable code may, when executed, cause the processor to perform certain tasks. The following tasks are in no way meant to limit the functionality of the system, and additional or less tasks may be performed by the processor in any given embodiment. Further embodiments may include ASICs to perform any or all of the features proposed herein. In some approaches, an ASIC may be considered a processor, with or without computer usable program code embodied therewith or accessible thereby.

In some embodiments, the GPS system 702 may send a request to transmit geographic data from a mobile GPS unit, where mobile GPS device and mobile GPS unit are used interchangeably herein. Any type of mobile GPS unit may be requested to transmit data, including GPS equipped mobile devices like mobile phones 706, BLACKBERRY devices 704, PALM devices, iPHONE devices, laptop or tablet personal computers (PC), GPS navigational devices adapted for removable mounting on a vehicle, etc.

In another approach, the mobile GPS unit may initiate the transfer of geographic data to the GPS system 702.

In some preferred embodiments, the communication between the various devices such as a vehicle mounted GPS system 702 and a mobile GPS unit 704, 706 may be effected via a wireless link, such as BLUETOOTH, WI-FI, RFID protocols, etc. Of course, the request may also be sent over a hardwired connection, such as a USB connection between devices, a docking station, etc.

Further, in some embodiments, the GPS system 702 may receive the geographic data from a mobile GPS unit 704, 706. The vehicle mounted GPS system, which may comprise a processor, may receive the geographic data through standard wired connections such as USB, FIREWIRE, etc., or it may receive the geographic data through a wireless link, such as BLUETOOTH, WI-FI, RFID, etc.

In some embodiments, the geographic data may comprise waypoints, destinations, origins, routes, speeds, distances, travel times, favorites, etc. Any type of data that may be useful for determining a location and/or calculating travel distances, travel durations, best travel routes, shortest travel routes, fastest travel routes, normal travelling tendencies, etc., may comprise geographic data and may be transmitting to and/or from the mobile GPS unit and the vehicle mounted GPS system. In one approach, the geographic data is a physical location in the form of longitudinal and latitudinal coordinates or any other format that is usable by the receiving device.

In additional embodiments, the GPS system 702 may integrate the received geographic data with previously stored data. Previously stored data may include present geographic location of the vehicle mounted GPS system, time, date, travelling speed, etc.

In some embodiments, integrating the received geographic data with previously stored data may include choosing only unique geographic data (i.e., geographic data which is different from previously stored geographic data) to receive into the memory of the vehicle mounted GPS system, such that after the data is received, the two GPS devices (vehicle mounted GPS system and portable GPS unit) may be synchronized, with the vehicle mounted GPS system having some or all the latest data stored in its memory. Also, a synchronization technique may be used where only unique geographic data is sent from the mobile GPS unit to the vehicle mounted GPS system, thereby reducing communication time and/or costs to accomplish the synchronization. A further synchronization technique may include transferring data both ways between the devices so that each has at least some common data thereon.

In some embodiments, the integrated geographic data may comprise newly acquired geographic data from the mobile GPS unit. In other embodiments, the integrated geographic data may comprise the newly acquired geographic data and any previously stored data, possibly including geographic data and other types of data.

In further approaches, the GPS system 702 may simply receive data from the mobile GPS system. In this and other approaches, the amount of data sent may be compressed, filtered, selected, or in some other way limited such that the transferring can take place faster and with less demand on the communication technique. For example, if all that is available to transfer data is a BLUETOOTH connection, less information may be sent until a more robust connection is established.

In some approaches, the processor may be caused to use the integrated geographic data to produce a geographic solution. A geographic solution may include a route between two or more locations; a map showing a location, destination, origin, etc.; directions to travel from one location to another; etc. Also, in some embodiments, the directions may be turn-by-turn directions of the type normally associated with vehicle mounted GPS systems, which may direct a driver to turn at certain intersections, continue driving for certain distances, and what kind of travelling time to expect.

In additional approaches, the geographic solution may include estimated travel time, elapsed travel time, average travelling speed, current travelling direction (north, south, east, west, etc.), etc. Preferably, such parameters of the geographic solution are selectable.

In some embodiments, the processor may be caused to output a geographic solution. Any type of geographic solution may be output, including but not limited to those types described above. In addition, the output of the geographic solution may be visual 710, verbal or audible 716, or both. For example, a visual output 710 may show a map 718 including a route between two locations, and a verbal output 716 may indicate turn-by-turn directions 720, such as approximate times to turn, when to continue straight, when to stop, etc.

Note that several illustrative embodiments described herein discuss transfer of information from a mobile GPS device 704, 706 to a GPS system 702 and/or use of such information by a GPS system 702. Such transfer and/or use may also be reversed, i.e., a mobile GPS device 704, 706 may receive and/or use information from a GPS system 702 such as a vehicle-mounted GPS system. Moreover, such transfer and/or use may also be performed between mobile GPS device 704, 706.

Figure 8:
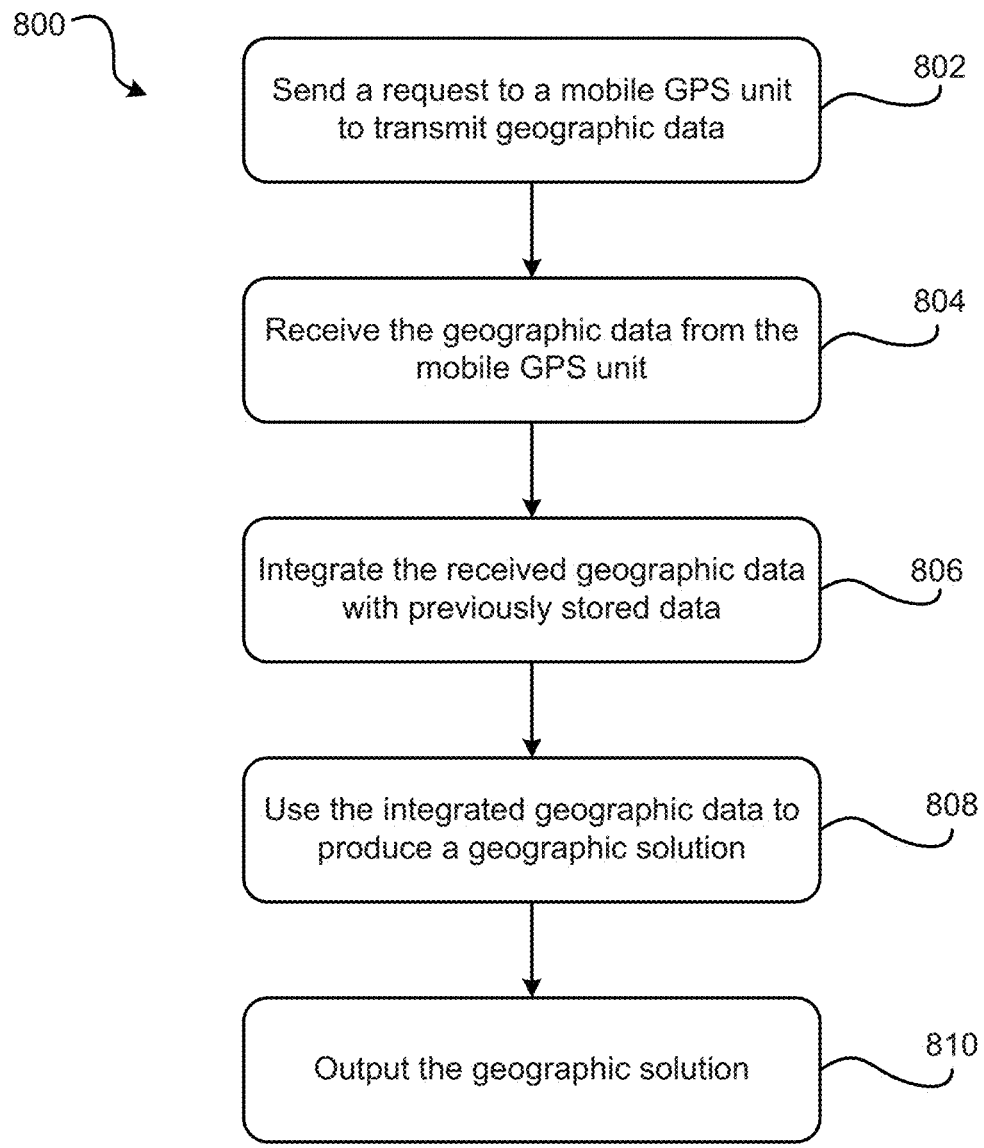
FIG. 8 shows a method according to one embodiment.

Now referring to FIG. 8, a method 800 according to one embodiment is shown. As an option, the method 800 may be implemented in the context of the architecture and environment of FIG. 7. Of course, however, the method 800 may be carried out in any desired environment. The method 800 is generally performed by a GPS equipped device, such as a vehicle mounted GPS system, but this example is for explanatory purposes only and in no way limits the scope of the invention.

With continued reference to FIG. 8, in operation 802, a request is sent e.g., from one device, to a mobile GPS unit, the request requesting that the mobile device transmit geographic data. This request may be initiated by a user, by another device, such as a vehicle mounted GPS system, or by any other system capable of producing such a request. For instance, this request may be initiated when a device, such as a vehicle mounted GPS system is powered on, when a car is started, when a certain event happens, after a connection between the devices is established, in response to a request received from the mobile GPS unit, etc. In addition, this request may be transmitted through a wireless link, such as those described herein, or may be through a hardwired link, such as described herein.

In some embodiments, the geographic data may be geographical data as described herein. In some approaches, the geographic data that is transferred may include or be limited to data and/or information derived from a user input, such as a favorite, waypoint, name of a location, address of a location, etc. Thus, in one approach, only geographic data somehow derived from user input may be synchronized, as opposed to geographic data not so derived, such as data preinstalled on the device. Moreover, geographic data specific to a particular user, e.g., associated with a user, may be selected for synchronization.

In operation 804, the geographic data from the mobile GPS unit is received. In some embodiments, only unique geographic data (i.e., geographic data which is different from previously stored geographic data) may be received, such that synchronization may take place within the device which has received the geographic data, such as a vehicle mounted GPS system.

In operation 806, the received geographic data is integrated with previously stored or generated data. In some embodiments, there may be no previously stored data, thereby allowing the received geographic data to be the only data presently stored in the memory of the device receiving the data, such as a vehicle mounted GPS system. In other embodiments, the device receiving the geographic data may have data previously stored thereon or presently generated, such as geographic data (including geographic data as described elsewhere herein, map data, present coordinates of the requesting device or some other location, etc.) and other types of data such as current time, temperature, synchronization data (including device information for data transfers, wireless and hardwired transmission protocols, etc.), management data (database format information, file format information, conversion tools, etc.), etc.

In operation 808, the integrated geographic data is used to produce a geographic solution. The geographic solution may include a route between two or more locations; a map showing a location, destination, origin, etc.; directions to travel from one location to another; etc. The map may be generated from data retrieved from a local computer readable medium, from a remote source e.g., via wireless link, etc.

Also, in some embodiments, the directions may be turn-by-turn directions of the type normally associated with vehicle mounted GPS systems, which may direct a driver to turn at certain intersections, continue driving for certain distances, what kind of travelling time to expect, etc.

In additional approaches, the geographic solution may include estimated travel time, elapsed travel time, average travelling speed, current travelling direction (north, south, east, west, etc.), etc. of the requesting and/or the sending device.

In operation 810, the geographic solution is outputted. Any type of geographic solution may be output, including but not limited to those types described above. In addition, the output of the geographic solution may be visual, verbal, or both. For example, a visual output may show a map including a route between two locations, and a verbal output may indicate turn-by-turn directions, such as approximate times to turn, when to continue straight, when to stop, etc.

Figure 9:
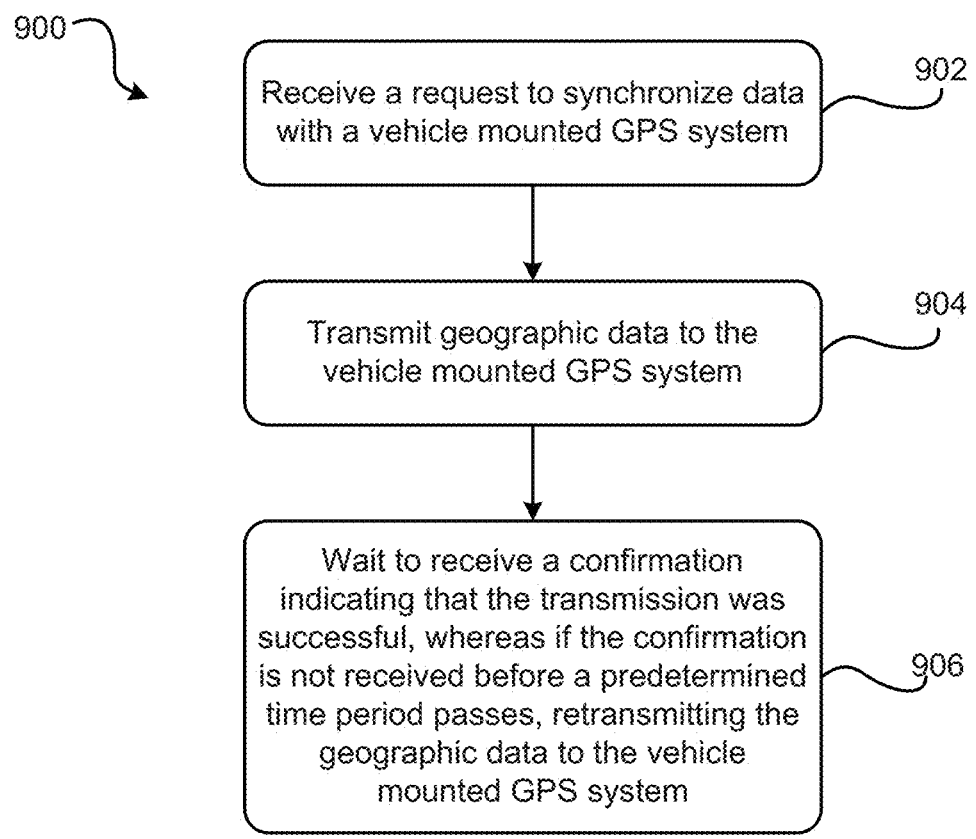
FIG. 9 shows a method according to one embodiment.

Now referring to FIG. 9, a method 900 according to one embodiment is shown. As an option, the method 900 may be implemented in the context of the architecture and environment of FIGS. 7-8. Of course, however, the method 900 may be carried out in any desired environment. The method 900 is generally performed by a GPS equipped device, such as a mobile GPS unit, like a mobile phone, BLACKBERRY, etc., but these examples are for explanatory purposes only and in no way limit the scope of the invention.

With continued reference to FIG. 9, in optional operation 902, a request to synchronize data with a vehicle mounted GPS system is received. This request may be initiated by a user, by the vehicle mounted GPS system, by another device, such as a mobile GPS unit, or by any other system capable of producing such a request. For instance, this request may be initiated when a requesting or receiving device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 904, geographic data is transmitted to a vehicle mounted GPS system. In some embodiments, the geographic data may be waypoints, destinations, origins, routes, speeds, distances, travel times, favorites (e.g., favorite locations, coordinates, etc.), etc., as well as any other type of geographic data set forth herein (as with any embodiment). In further embodiments, the geographic data may comprise any type of data that may be useful for calculating travel distances, travel durations, best travel routes, shortest travel routes, fastest travel routes, normal travelling tendencies, etc., and may be transmitted to and/or from devices, such as a mobile GPS unit and the vehicle mounted GPS system.

In optional operation 906, a confirmation indicating that the transmission was successful is waited for, whereas if the confirmation is not received before a predetermined time period elapses, the geographic data may be retransmitted to the vehicle mounted GPS system. The predetermined time period may be any length of time, including several microseconds up to about a minute or longer. In some embodiments, it may take longer to transmit all the geographic data, and therefore longer waiting periods are possible depending on the circumstances of the individual application.

Figure 10:
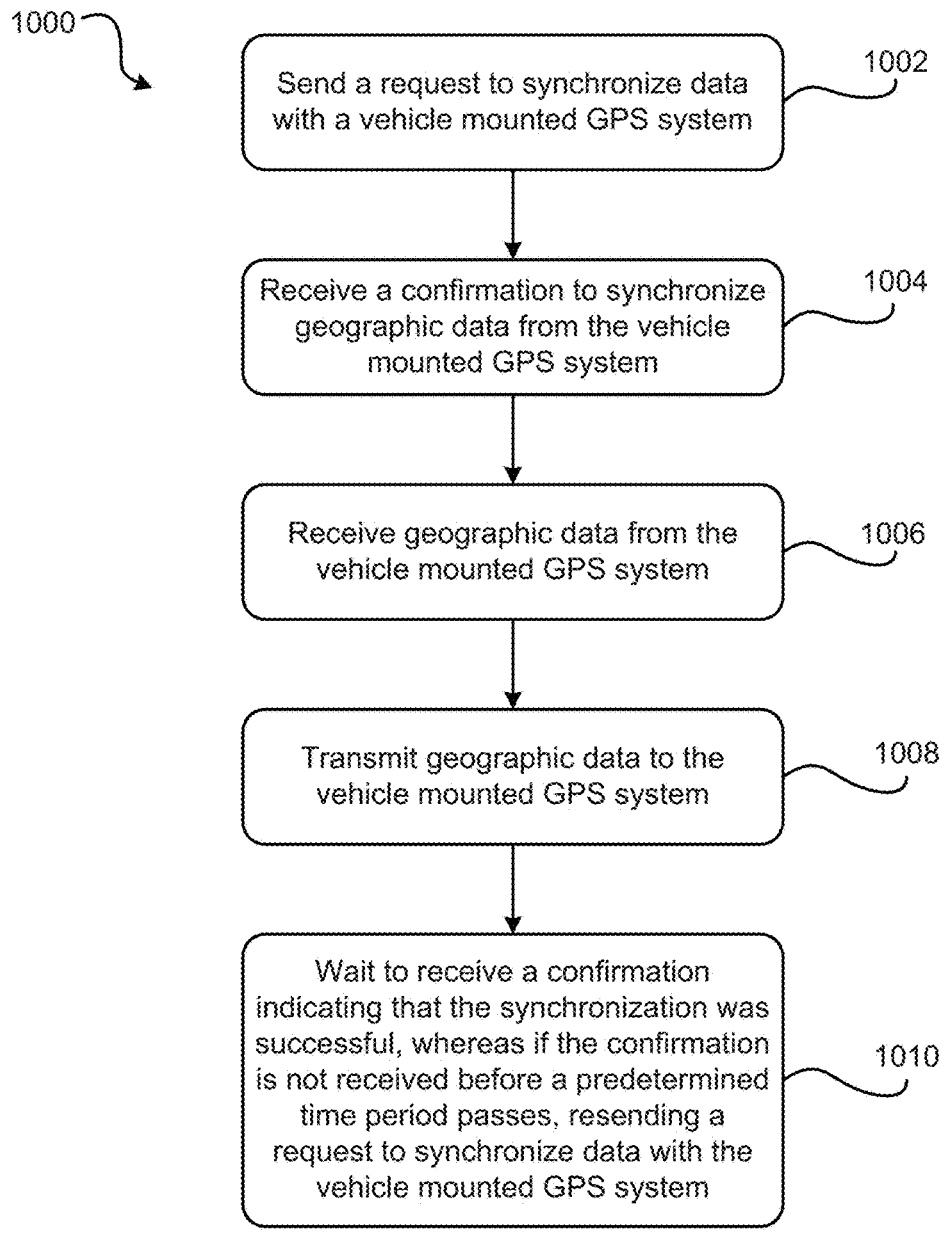
FIG. 10 shows a method according to one embodiment.

Now referring to FIG. 10, a method 1000 according to one embodiment is shown. As an option, the method 1000 may be implemented in the context of the architecture and environment of FIGS. 7-9. Of course, however, the method 1000 may be carried out in any desired environment. The method 1000 is generally performed by a GPS equipped device, such as a mobile GPS unit, like a mobile phone, BLACKBERRY, etc., but these examples are for explanatory purposes only and in no way limit the scope of the invention.

With continued reference to FIG. 10, in operation 1002, a request to synchronize data with a vehicle mounted GPS system is sent. This request may be initiated by a user, by another device, such as a vehicle mounted GPS system, or by any other system capable of producing such a request. For instance, this request may be initiated when a device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 1004, a confirmation to synchronize geographic data is received from the vehicle mounted GPS system. Any type of geographic data, as described above, may be included in the synchronization. In addition, other types of data that would be helpful in performing tasks by the two GPS equipped devices may be synchronized as well.

In operations 1006 and 1008, geographic data is communicated between the vehicle mounted GPS system and the requesting device, such as a mobile GPS unit. Once again, additional types of data may be transmitted and/or received in the synchronization, depending on the particular application and circumstances.

In operation 1010, a confirmation indicating that the synchronization was successful is waited for, whereas if the confirmation is not received before a predetermined time period passes, the request to synchronize data is resent to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application.

Figure 11:
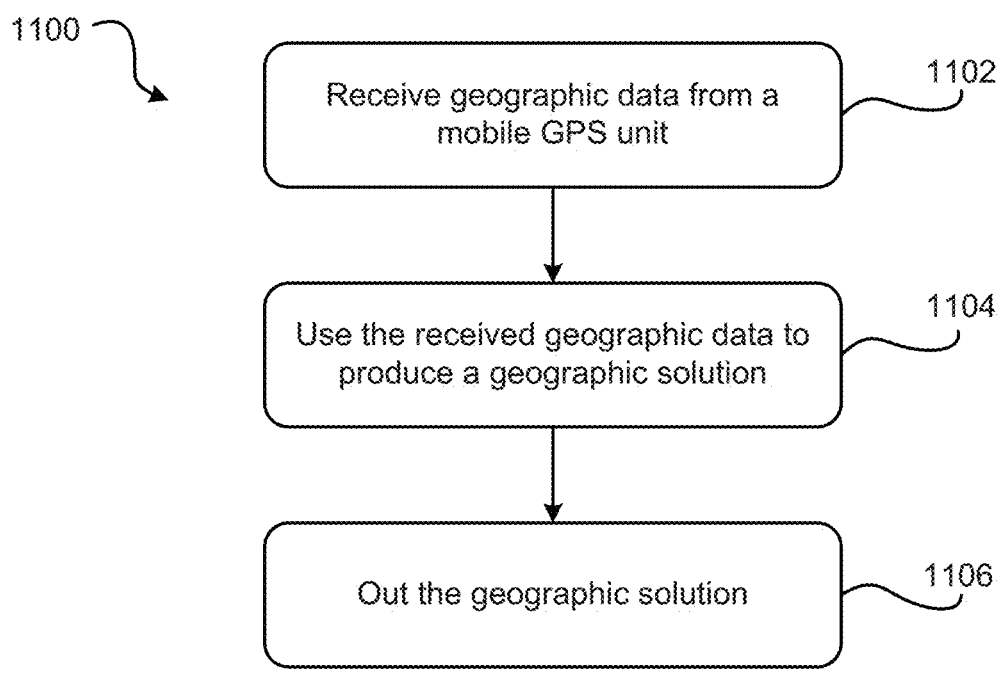
FIG. 11 shows a method according to one embodiment.

Now referring to FIG. 11, a method 1100 according to one embodiment is shown. As an option, the method 1100 may be implemented in the context of the architecture and environment of FIGS. 7-10. Of course, however, the method 1100 may be carried out in any desired environment. The method 1100 is generally performed by a GPS equipped device, such as a vehicle mounted GPS system, like a car navigation system, but this example is for explanatory purposes only and in no way limits the scope of the invention.

With continued reference to FIG. 11, in operation 1102, geographic data from a mobile GPS unit is received. All of the previous descriptions of geographic data, mobile GPS units, etc., apply to these embodiments.

In operation 1104, the received geographic data is used to produce a geographic solution. A geographic solution may be of any of the types previously described.

In operation 1106, the geographic solution is output, verbally, visually, or otherwise. In preferred embodiments, the geographic solution may be output both verbally as turn-by-turn directions, and visually as a map or dynamic route.

Figure 12:
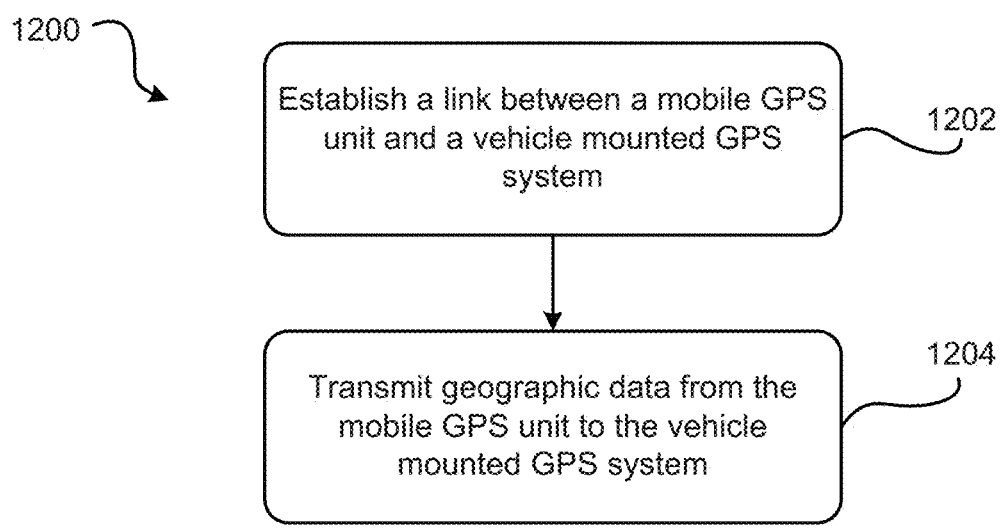
FIG. 12 shows a method according to one embodiment.

Now referring to FIG. 12, a method 1200 according to one embodiment is shown. As an option, the method 1200 may be implemented in the context of the architecture and environment of FIGS. 7-11. Of course, however, the method 1200 may be carried out in any desired environment.

With continued reference to FIG. 12, in operation 1202, a link is established between a mobile GPS unit and a vehicle mounted GPS system. In some embodiments, the mobile GPS unit may be a mobile phone, BLACKBERRY device, personal GPS unit, another vehicle mounted GPS system in the same or a different vehicle, etc. The vehicle mounted GPS system may be a car navigation system, an airplane navigation system, etc., and may be permanently mounted in the vehicle, or removable, such as a MAGELLAN navigation system.

In some embodiments, the synchronization and/or transfer of geographic data may be between a mobile GPS unit and a vehicle mounted GPS unit, a mobile GPS unit and a mobile GPS unit, or a vehicle mounted GPS unit and a vehicle mounted GPS unit.

In operation 1204, geographic data is transmitted from the mobile GPS unit to the vehicle mounted GPS system. Also, in some embodiments, the vehicle mounted GPS system may transfer and/or synchronize geographic data to the mobile GPS unit.

All of the preceding descriptions of mobile GPS units, vehicle mounted GPS systems, geographic data, hardwired and wireless links, etc., apply to this embodiment.

In addition, the link may be established automatically by either device each time the device is powered on, each time a device is in range of a wireless connection, each time a hardwired connection is established, each time a certain event occurs, such as passage of time, application started, user initiation, etc.

In some embodiments, the mobile GPS unit may wait to receive a confirmation indicating that the transmission was successful, whereas if the confirmation is not received before a predetermined time period passes, the geographic data is retransmitted to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application. Also, an action may terminate the period of time early, such as user input, the device powering down, etc.

Figure 13:
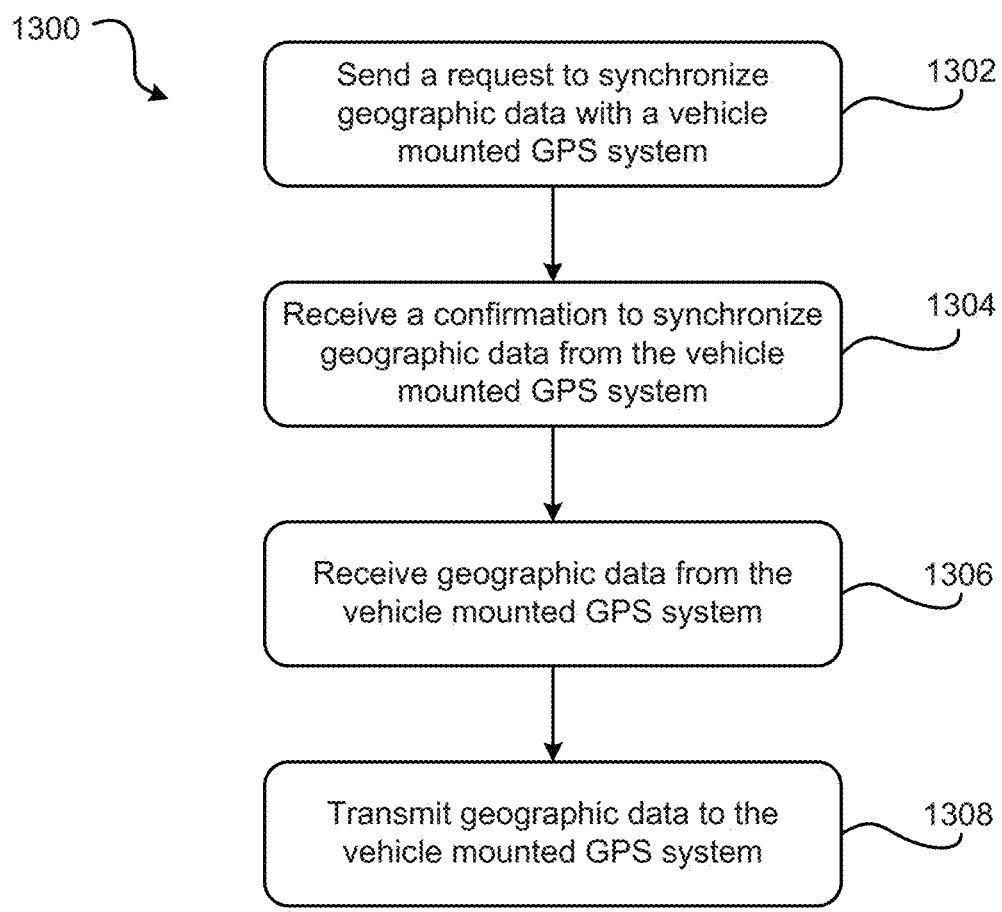
FIG. 13 shows a method according to one embodiment.

Now referring to FIG. 13, a method 1300 according to one embodiment is shown. As an option, the method 1300 may be implemented in the context of the architecture and environment of FIGS. 7-12. Of course, however, the method 1300 may be carried out in any desired environment. The method 1300 is generally performed by a GPS equipped device, such as a mobile GPS unit, like a mobile phone, BLACKBERRY, etc., but these examples are for explanatory purposes only and in no way limit the scope of the invention.

With continued reference to FIG. 13, in operation 1302, a request to synchronize data with a vehicle mounted GPS system is sent. This request may be initiated by a user, by another device, such as a vehicle mounted GPS system, or by any other system capable of producing such a request. For instance, this request may be initiated when a device, such as a mobile GPS unit is powered on, when a mobile GPS unit is brought within a certain distance of another GPS equipped device, when a certain event happens, etc. In addition, this request may be transmitted through a wireless link, such as those described above, or may be through a hardwired link, as described above.

In operation 1304, a confirmation to synchronize geographic data is received from the vehicle mounted GPS system. Any type of geographic data, as described above, may be included in the synchronization. In addition, other types of data that would be helpful in performing tasks by the two GPs equipped devices may be synchronized as well.

In operations 1306 and 1308, geographic data is communicated between the vehicle mounted GPS system and another device, such as a mobile GPS unit. Once again, additional types of data may be transmitted and/or received in the synchronization, depending on the particular application and circumstances.

In some embodiments, a confirmation indicating that the synchronization was successful may be waited for, whereas if the confirmation is not received before a predetermined time period passes, the request to synchronize data may be resent to the vehicle mounted GPS system. The predetermined time period may be any length of time, including several seconds up to about a minute. In some embodiments, it may take longer to transmit all the geographic data, and therefore longer waiting periods are possible depending on the circumstances of the individual application. Also, an action may terminate the period of time early, such as user input, the device powering down, etc.

In some embodiments, the mobile GPS unit may be a mobile unit that is not equipped with GPS functionality, but is capable of storing and/or transferring geographic and/or GPS data which might be useful for a vehicle mounted GPS system to determine a geographic solution. These devices may have Internet connectivity, such that Internet map applications may be used to select, store, manipulate, etc., geographic data, which can then be transferred and/or synchronized with another mobile GPS unit and/or vehicle mounted GPS system.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

While the present invention has been illustrated and described with reference to specific embodiments, further modification and improvements will occur to those skilled in the art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN, BLUETOOTH, RFID, or other means of communication. In addition, various combinations of wired, wireless (e.g., radio frequency) and optical communication links may be utilized with any of the embodiments.

The program environment in which a present embodiment of the invention may be executed illustratively incorporates one or more general-purpose computers or special-purpose devices. Special purpose devices may include vehicle mounted GPS systems, mobile GPS units (e.g., a GPS equipped mobile phone, a GPS equipped BLACKBERRY, a GPS equipped PALM, a GARMIN GPS device, a MAGELLAN GPS device, etc.). Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD, DVD, magnetic memory, semiconductor memory (e.g., FLASH memory and other portable memory cards, etc.), etc. Further, such computer program can be downloadable or otherwise transferable from one computing device to another via network, wireless link, nonvolatile memory device, etc. to create a computer program product on the device receiving and/or storing the computer program.

In addition, some or all of the aforementioned embodiments, as stored in code, may be embodied on any computer readable storage media including magnetic tape, flash memory, system memory, hard drive, network memory, etc. Additionally, some or all of the code may be printed or otherwise visually displayed on an object (e.g., some or all of the code may be displayed on a card, paper, etc.).

EXAMPLES

The following examples are for explanatory purposes only, and in no way limit the scope of the claimed invention or the plethora of possible embodiments thereof.

In one example, the vehicle mounted GPS system may be a navigational unit in an automobile, such as a factory installed unit or an aftermarket unit. The user of the GPS system may have a portable device, such as a mobile phone, which is equipped with GPS functionality, such that geographic data may be stored in the memory of the mobile phone, such as waypoints, destinations, favorites, routes, etc. Any type of geographic data may be useful when this user drives the automobile. Therefore, in some embodiments, the user might be prompted to synchronize the mobile phone when the car is started or the GPS system is powered on. If the user allows the synchronization, the mobile phone may then transmit geographic data to the GPS system, thereby increasing the stored data on the GPS system, and allowing the user to access the geographic data that is on the mobile device through the vehicle mounted GPS system. The GPS system may then use the new geographic data to calculate geographic solutions, such as turn-by-turn directions from the user's home to a destination, such as a friend's house or store.

In another example, the vehicle mounted GPS system may be on a fishing boat, whereas a user may have a portable GPS device, such as a personal GPS unit. The user may go fishing with a friend and bring along his personal GPS unit, and the fishing trip may be successful prompting the user to want to return to the same location in his own boat sometime in the future. The user's personal GPS unit may receive geographic data from the vehicle mounted GPS unit, and/or the user may store a waypoint during the trip, etc. Thereafter, the data in the user's personal GPS unit can be synchronized with the vehicle mounted GPS system in the user's fishing boat, causing his vehicle mounted GPS system to now have the favorite fishing spot accessible to direct the user to the same location again to the good fishing area.

In yet another example, a user may be on a business trip in a foreign city, and may come across a destination that he may want to return to again when he has more time on his hands. He could store the destination in his GPS equipped mobile phone as a favorite, waypoint, etc., and then when he returned to the city sometime in the future, driving a GPS equipped rental car, for instance, he could synchronize his mobile phone with the navigational system in the rental car, thereby allowing the user to access the favorite destination from the rental car's navigational system, and may receive turn-by-turn directions on how to return to the desired destination, possibly verbal prompts on when to turn, how far to drive, and which direction to travel.

In a further example, a user may have a mobile phone which does not have GPS functionality, but has access to the Internet. This user may download and/or setup a desired location through an Internet or network-based mapping service, such as GOOGLE MAPS, YAHOO! MAPS, BLACKBERRY MAPS, etc., which the user may want to transfer to a vehicle mounted GPS system, such as one that might be in an automobile. When the user turned on the automobile, the vehicle mounted GPS system could query all devices within range to determine if any geographic data is available. The mobile phone could then transfer one or more saved locations from the mobile phone to the vehicle mounted GPS system, possibly through a wireless BLUETOOTH connection, thus eliminating the need to reprogram the desired locations on the vehicle mounted GPS system, saving time, effort, and ensuring that the proper locations are stored in the vehicle mounted GPS system. The vehicle mounted GPS system could then output, visually as a map and verbally through turn-by-turn directions, the route to travel to arrive at one or more desired locations from the current location as determined by the vehicle mounted GPS system.

In a different example, two vehicle mounted GPS systems may have different geographic data stored therein. For example, perhaps the GPS system of the first vehicle has several waypoints or favorite locations stored therein by the primary driver of the first vehicle, while the second vehicle has several waypoints or favorite locations stored therein by the primary driver of the second vehicle The vehicle mounted GPS systems may be car navigation systems, either factory installed or aftermarket purchased and installed. The cars may be parked next to each other and use a BLUETOOTH connection, mobile telephone network connection, messaging protocol, WiFi, etc. to transfer and/or synchronize geographic data between the navigation systems in each car, either unidirectionally (e.g., synched from the first system to the other but not vice versa or bidirectionally (e.g., the data is synched across both devices so that both devices have data from the other device). The two navigation systems also may be synchronized and/or transfer geographic data between each other through a hardwired connection, transfer of data on a portable memory device, etc., such that some or all unique geographic data on one device is transferred to the other device, and optionally vice versa. In this way, a user can ensure that each vehicle has the same or selected geographic data accessible from each car's navigation system. Similarly, a detachable navigation system may be taken to another vehicle mounted GPS system, and a synchronization and/or transfer of geographic data may be achieved in this fashion.

While various embodiments have been described above, it should be understood that they have been presented by way of example only, and not limitation. Moreover, features described herein may be combined in any manner to create a plethora of embodiments. Thus, the breadth and scope of an embodiment should not be limited by any of the above-described exemplary embodiments, but should be defined only in accordance with the following claims and their equivalents.

What is claimed is:

1. A system, comprising:
a first mobile device comprising a processor; and
a computer usable medium, the computer usable medium having computer usable program code embodied therewith, which when executed by the processor causes the processor to:
send, from the first mobile device, a request including information associated with a mobile device of a friend of a user;
determine a first location of the first mobile device;
receive, in response to the request, a location of the mobile device of the friend of the user;
establish a link with a global positioning service (GPS) system;
transmit geographical data to the GPS system, wherein the geographical data includes the location of the mobile device of the friend of the user and the first location of the first mobile device; and
output a geographic solution on the first mobile device, wherein the geographic solution includes: a calculated route between the first location of the first mobile device and the location of the mobile device of the friend of the user, and information associated with the calculated route, the information including one or more of an estimated travel time, an average travelling speed, and an elapsed travel time.

2. A system as recited in claim 1, wherein the calculated route is calculated based in part on one or more of: whether the calculated route is to be traveled by automobile or foot, available modes of transit, fees associated with the calculated route, traffic conditions on the calculated route, and restrictions on the calculated route.

3. A system as recited in claim 1, wherein the location of the mobile device of the friend of the user is received at the first mobile device in a text message.

4. A system as recited in claim 1, wherein the geographic solution further comprises a calculated route between the first mobile device and the location of the mobile device of the friend of the user.

5. A system as recited in claim 1, wherein an amount of the geographical data transmitted to the GPS system is based, at least in part on, the link established between the first mobile device and the GPS system.

6. A system as recited in claim 1, further comprising computer usable program code executable by the processor to cause the processor to: receive, from the GPS system, additional geographical data at the first mobile device.

7. A system as recited in claim 1, wherein the calculated route is output as one or more of: a map, a list of directions, and audible directions.

8. A system as recited in claim 7, wherein the map includes satellite imagery.

9. A method, comprising:
sending, from a first mobile device, a request including information associated with a mobile device of a friend of a user;
determining a first location of the first mobile device;

receiving, in response to the request, a location of the mobile device of the friend of the user;

establishing a link with a global positioning service (GPS) system;

transmitting geographical data to the GPS system, wherein the geographical data includes the location of the mobile device of the friend of the user and the first location of the first mobile device; and outputting a geographic solution on the first mobile device, wherein the geographic solution includes: a calculated route between the first location of the first mobile device and the location of the mobile device of the friend of the user, and information associated with the calculated route, the information including one or more of an estimated travel time, an average travelling speed, and an elapsed travel time.

10. A method, comprising:

sending a request from a first mobile device, including information associated with a mobile device of a friend of a user;

determining a first location of the first mobile device;

receiving, in response to the request, a location of the mobile device of the friend of the user;

establishing a link with a global positioning service (GPS) system;

transmitting geographical data to the GPS system, wherein the geographical data includes the location of the mobile device of the friend of the user and the first location of the first mobile device; and outputting a geographic solution on the first mobile device, wherein the geographic solution includes: a calculated route between the first location of the first mobile device and the location of the mobile device of the friend of the user and the first location of the first mobile device.

11. A method as recited in claim 10, wherein the first mobile device is a mobile phone.

12. A method as recited in claim 10, further comprising sending a request to the first mobile device to resend the geographical data to the GPS system in response to determining that the geographical data was not received by the GPS system within a predetermined time period.

13. A system, comprising:

a server including a processor for:

receiving a request from a first mobile device including information associated with a mobile device of a friend of a user;

determining a location of the mobile device of the friend of the user;

sending to the first mobile device the location of the mobile device of the friend of the user;

wherein the first mobile device establishes a link with a global positioning service (GPS) system;

wherein the first mobile device transmits geographical data to the GPS system, wherein the geographical data includes the location of the mobile device of the friend of the user;

wherein the first mobile device outputs a geographic solution, wherein the geographic solution includes: a calculated route between a location of the first mobile device and the location of the mobile device of the friend of the user, and information associated with the calculated route, the information including one or more of an estimated travel time, an average travelling speed, and an elapsed travel time.

14. A system as recited in claim 13, wherein the first mobile device is a mobile phone.

15. A system as recited in claim 13, further comprising: sending a confirmation to the first mobile device that the geographic data was successfully received at the GPS system.

16. A method, comprising:

receiving at a server a request from a first mobile device including information associated with a mobile device of a friend of a user;

determining at the server a location of the mobile device of the friend of the user;

sending from the server to the first mobile device the location of the mobile device of the friend of the user;

wherein the first mobile device establishes a link with a global positioning service (GPS) system;

wherein the first mobile device transmits geographical data to the GPS system, wherein the geographical data includes the location of the mobile device of the friend of the user;

wherein the first mobile device outputs a geographic solution, wherein the geographic solution includes: a calculated route between a location of the first mobile device and the location of the mobile device of the friend of the user, and information associated with the calculated route, the information including one or more of an estimated travel time, an average travelling speed, and an elapsed travel time.

17. A method as recited in claim 16, further comprising transmitting all geographic data stored on the first mobile device to the GPS system, the geographic data being selected from the group consisting of: waypoints, destinations, origins, routes, distances, travel times, and combinations thereof.

18. A method, comprising:

receiving at a server a request from a first mobile device including information associated with a mobile device of a friend of a user;

determining at the server a location of the mobile device of the friend of the user; and sending from the server to the first mobile device the location of the mobile device of the friend of the user;

wherein the first mobile device establishes a link with a global positioning service (GPS) system;

wherein the first mobile device transmits geographical data to the GPS system, wherein the geographical data includes the location of the mobile device of the friend of the user;

wherein the first mobile device outputs a geographic solution, wherein the geographic solution includes: a calculated route between a location of the first mobile device and the location of the mobile device of the friend of the user.

19. A method as recited in claim 18, wherein the first mobile device is in direct communication with the GPS system via at least one of a hardwired connection, a local area network only, and a direct wireless connection.

20. A method as recited in claim 18, further comprising waiting for a confirmation that the geographic data stored on the first mobile device was successfully received at the GPS system, wherein the geographical data stored on the first mobile device is resent to the GPS system in response to determining that the confirmation has not been received at the first mobile device before a predetermined time period elapses.

* * * * *